UNITED STATES PATENT OFFICE.

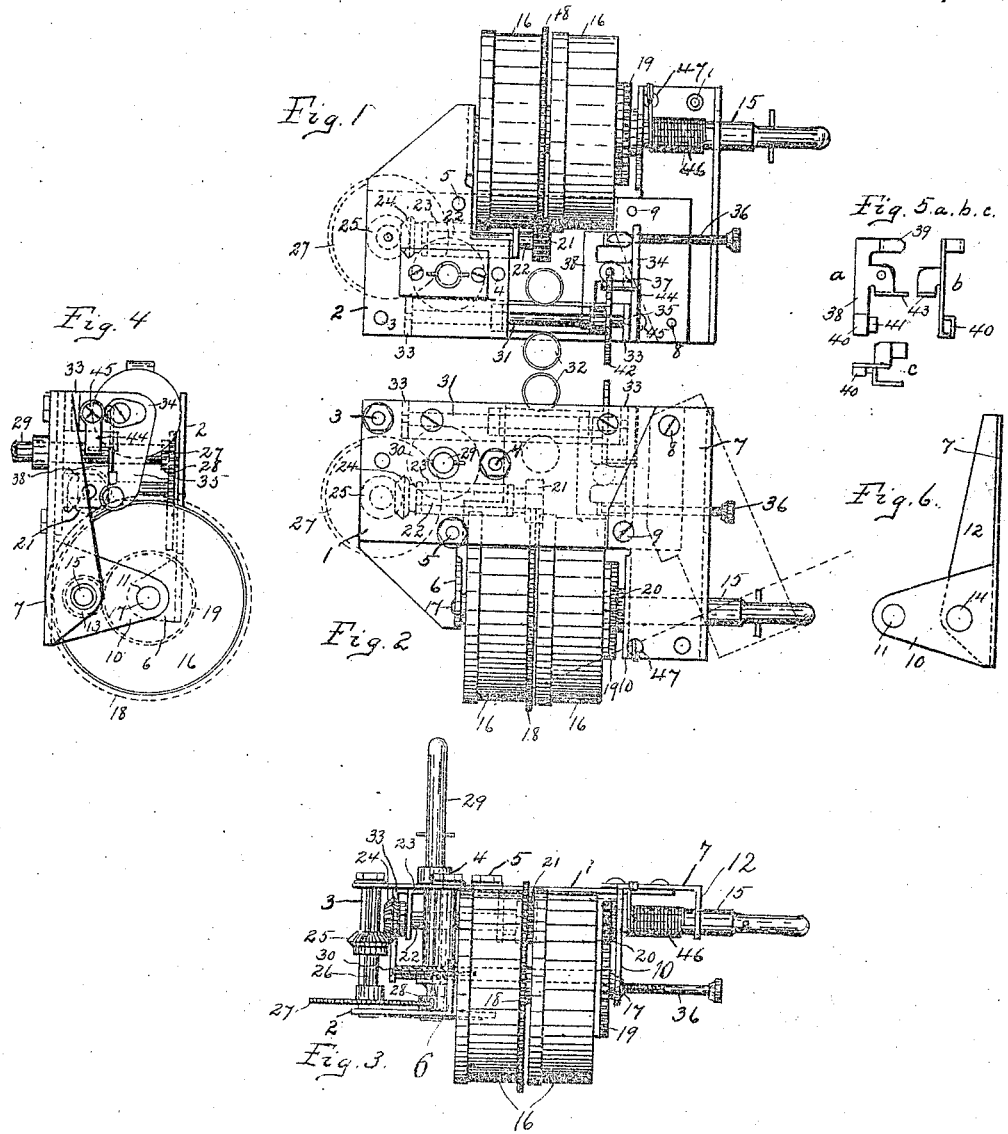

PLINY CATUCCI, OF NEWARK, NEW JERSEY, ASSIGNOR TO A. F. MEISSELBACH & BROTHER, A CORPORATION OF NEW JERSEY.

SPRING-MOTOR FOR TALKING-MACHINES.

1,162,033. Specification of Letters Patent. Patented Nov. 30, 1915.

Application filed September 24, 1914. Serial No. 863,277.

*To all whom it may concern:*

Be it known that I, PLINY CATUCCI, a citizen of the United States, residing in the city of Newark, county of Essex, and State of New Jersey, have invented certain new and useful Improvements in Spring-Motors for Talking-Machines, of which the following is a full, clear, and exact description, such as will enable others skilled in the art to make and use the same.

My invention relates to spring motors for talking machines of the disk type and has for its object the general improvement of the structure of such motors as well as the specific improvement in a detachable connection for the spring barrel of such motors.

It quite frequently happens, in the general and varied use to which talking machine motors are put, that the spring or springs within the spring barrel of the motor will break. Under such conditions it is necessary to return the motor to the factory for repair. Again, the user of the talking machine may require the substitution of a longer spring, thereby permitting the motor itself, when wound up, to run longer than it would with the spring ordinarily placed within the spring barrel. These and other conditions arise which make it necessary to remove the spring barrel from the motor frame for repair, the substitution of another spring barrel, or for any other possible purpose, and my invention relates more specifically to the means by which the spring barrel and its contained spring may be removed from the motor frame without disturbing any of the other parts thereof.

In the accompanying drawings Figure 1, is a bottom plan view of my improved motor. Fig. 2, is a top plan view of the same. Fig. 3, is a side elevation of the motor. Fig. 4, is an end elevation. Fig. 5, *a*, *b*, and *c*, are views respectively of one of the details in plan, side and end elevation. Fig. 6, is a detached side elevation of the main shaft bearing plate.

Similar reference numerals refer to like parts throughout the specification and drawings.

In order that a full understanding of the operation of the motor may be had, I have given a complete description of the same, although it is to be understood that in the main the description is directed to the means for detachably supporting the spring barrel and main shaft. The motor frame consists of the top plate 1, of rectangular shape, provided with bearing apertures for the upper ends of the various gear shafts; and the bottom plate 2, which is of L-shape. The two plates 1 and 2, are secured together by means of the spacing studs 3, 4 and 5, in the usual manner. Extending upwardly from the bottom plate 2, is the bearing 6, provided with a suitable aperture to receive the main shaft hereinafter more fully described.

Looking at Fig. 2, upon the right hand end of the plate 1, will be seen the detachable or pivoted bearing plate 7. This plate 7 is secured to the upper face of the plate 1, by means of the two screws 8 and 9. The bearing plate 7 is provided with the downwardly extending bearing support 10, apertured as at 11, in alinement with the corresponding aperture in the bearing 6, of the lower plate. The free edge of the plate 7 is provided with a downwardly extending strengthening flange 12, of triangular shape and provided at its widest portion with an aperture 13, in vertical alinement with the corresponding aperture 14, in the bearing support 10. The two apertures 13 and 14 are designed to form a bearing for the winding shaft 15.

The spring barrels 16, are of the type shown in my Patent No. 1,029,852, June 18th, 1912, wherein tandem springs are shown and described. The two spring barrels 16, are mounted upon the sectional shaft 17, upon which is also mounted a driving gear 18, said gear being rigidly connected to one of the spring barrels 16, and meshing with the first driven gear of the train. Upon the opposite end of the shaft and outside of the right hand spring barrel, is rigidly secured a second gear wheel 19. Upon the inner end of the winding shaft 15 is located a driving gear 20, engaging the gear 19. From this structure it will be readily understood that the turning of the winding shaft by means of the usual crank will result in winding up the spring in the right hand barrel which in turn will exert its pressure through the sectional shaft 17, upon the other spring barrel and thereby wind up the spring therein so that both springs are wound simultaneously and give the result or effect of a single spring, double the length of one of the springs within the spring barrels 16.

As above indicated, the bearing plate, with its support 10, for the main spring shaft 17, is secured to the upper plate 1, by means of the screws 8 and 9. If, for any reason, it is desired to remove the spring barrels 16, and their shaft 17, from the frame of the machine, it is only necessary to remove the screw 9, when, of course, the bearing plate 7 may be swung into the dotted line position as shown in Fig. 2, carrying with it the winding shaft 15 and gear 20, while the bearing aperture 11 is released from the right hand end of the shaft 17. In this position the spring barrel 16 may be readily moved from the other bearing 6 and replaced by another spring barrel if desired, and returned to position. This may be done without even removing the motor from its case.

The driving gear 18 engages a gear 21 upon the shaft 22, which latter shaft is carried in a bracket 23, secured to the under face of the upper plate 1. The opposite end of the shaft 22 is provided with the bevel gear 24, meshing with a similar gear 25, upon the vertical shaft 26; the latter shaft being carried in suitable bearings in the plates 1 and 2. Rigidly secured to the lower end of the shaft 26, is a comparatively large gear wheel 27 which engages a smaller gear 28, upon the mandrel shaft 29; the latter shaft extends upwardly through the upper plate 1 to a considerable distance and is designed to receive the tablet support for the record. Rigidly secured to this mandrel shaft is a driving worm wheel 30, which meshes with a worm on a worm shaft 31, which latter carries the usual governor 32. The shaft 31 is mounted in a suitable bracket hanger 33 secured to the under face of the plate 1.

As a means for regulating the speed of the motor through the governor, I provide the following mechanism. Upon the bracket 33, I secure a plate 34 providing the same with a lateral extension 35. At the free end of said bracket extension I provide a threaded aperture to receive the governing screw 36. About midway of the length of the bracket extension 35, I provide a lateral bearing support 37, upon which is pivoted the brake lever 38. This brake lever is shown in detail in Fig. 5, a, b and c. At the upper end of the lever, as shown in said figure, there is an L-shaped projection 39, the free end of which is designed for contact with the inner face of the bracket extension 35, while the vertical portion of said L-shaped extension is in alinement with the inner end of the regulating screw 36, so that as said screw is screwed back and forth the brake lever 38, being pivoted upon the bracket extension 37, may swing back and forth. Upon the free end of said brake lever 38, I provide a loop 40, to receive the brake felt 41, which bears upon the brake disk 42 of the governor as will be readily understood, and is usual in structures of this character. As a means for yieldingly holding said brake felt away from the disk 42, I provide the brake lever 38 with an upward and forward extending projection 43 in position to bear upon a flat spring 44, which latter is secured by means of the screw 45 to the bracket 34, as clearly shown in Fig. 4. The tendency of such spring 45, is to swing the brake lever 38 upon its pivot, away from the brake disk 42, and causing the opposite end to bear upon the governing screw 36. If, now, the governor screw 36 is screwed inwardly it will cause the brake lever to pivot with the brake felt 40, bearing upon the rotating disk 42. This braking mechanism may serve also to completely stop the motor if desired.

As a substitute for the usual pawl and ratchet mechanism upon the winding shaft, I substitute a well known equivalent in the form of a coil spring 46, closely embracing said shaft, having one end thereof carried upward and coiled through an aperture 47 in the end plate 7, as clearly shown in Figs. 1 and 3. The rotation of the shaft 15, by means of the usual crank, has a tendency to uncoil the spring and thus loosen its grip upon the surface of the shaft, thus permitting the free rotation thereof in one direction. Of course, the tendency of the driving spring in the spring barrel 16, is to rotate the shaft in the opposite direction, but the moment this tendency becomes effective the spring 46 hugs the shaft so closely as to effectually prevent rotation in the direction opposite to the usual winding.

From the above description, it will be seen that the winding shaft 15 and its gear 20, are carried by the bearing plate 7. The bearing extension 10 supports one end of the spring shaft 17, while the opposite end is supported by the bearing support 6, so that when the screw 9 is removed and the plate 7 swung into the dotted line position, the gear 20 swings clear of the gear 19 and the spring barrels 16, together with the gear 18, may be readily removed from the motor frame without disturbing any other element of the motor.

In case a single spring barrel is desired, in place of a double spring barrel, such spring barrel may be mounted upon a solid driving shaft of standard length to fit the bearings 11 and 6. Of course if a plurality of spring barrels such as indicated in my prior patent above referred to are desired, then the upper plate 1 may be extended and the bearing plate 7 secured to such extension, for it will be readily understood that a third or even a fourth spring mounted upon a correspondingly sectional shaft 17, would not change the location of the driving gear 18, since that is always located adjacent to the last spring barrel in the series.

From the above description it will be seen that I accomplish the object of my invention by means at once simple and thereby I am able to obviate some of the serious difficulties in the use of talking machine motors.

I claim:

1. In a spring motor, the combination of a motor frame, a driving shaft having a spring barrel mounted thereon, means for detachably mounting said shaft and spring barrel upon said frame comprising a bearing rigidly connected to said frame for carrying one end of said shaft, and a second bearing support pivotally mounted upon said frame for supporting the other end of said shaft and means for rigidly securing said second bearing support to said frame.

2. In a spring motor, the combination of a motor frame, a gear train mounted in said frame, a driving shaft upon said frame, said shaft having a gear thereon for driving said gear train, means for detachably supporting said shaft upon said frame comprising a bearing for one end of said shaft rigidly mounted upon said frame, and a detachable bearing for the other end of said shaft, said detachable bearing being provided with means whereby it may be rigidly secured to said frame to support the other end of said shaft or swing upon a pivot to release said shaft and permit its removal from said frame without disturbing said gear train.

3. In a spring motor, the combination of a motor frame comprising upper and lower plates, spacing studs for rigidly securing said plates together, a gear train mounted in said frame between said plates, a spring driven driving shaft having a gear thereon for driving said gear train, means for detachably supporting said driving shaft upon said frame comprising a rigid bearing support upon one of said plates for supporting one end of said shaft, and a detachable bearing support upon one of said plates for supporting the other end of said shaft, means whereby said detachable support may be either rigidly secured to said plate to support said shaft, or swing upon a pivot to release said shaft and permit its removal from said frame without disturbing the gear train.

4. In a spring motor, the combination of a motor frame comprising upper and lower frame plates with spacing bolts rigidly connecting said plates together, a gear train supported by and between said plates, a driving shaft having a gear connection with said train for driving the same, and means for detachably supporting said driving shaft in said frame comprising a rigid bearing support mounted upon one of said frame plates for supporting one end of said shaft, and a pivoted bearing support for the other end of said shaft, and means for rigidly but detachably securing said support to one of said frame plates whereby said shaft may be disconnected from it without disturbing said gear train.

5. In a spring motor, the combination of a motor frame, a gear train mounted in said frame, a driving shaft having a gear thereon for driving said gear train, means for detachably supporting said driving shaft upon said frame comprising a rigid bearing for one end of said shaft and a pivoted bearing for the other end of said shaft, means for rigidly securing said pivoted bearing to and releasing it from said frame whereby said shaft may be firmly held in said frame or released therefrom without disturbing said gear train.

6. In a spring motor, the combination of a motor frame, a spring driven shaft mounted in bearings in said frame, one of said bearings being rigidly connected to said frame and the other of said bearings being rigidly connected to said frame but having a detachable connection therewith whereby said bearing may be swung upon a pivot to release said shaft from said frame.

7. In a spring motor, the combination of a motor frame and a spring driven driving shaft mounted to rotate in said frame, a bearing for one end of said shaft integral with said frame, and a bearing for the other end of said shaft, said latter bearing having means for rigidly connecting it to said frame or for permitting it to swing upon a pivot whereby said shaft may be released from said frame.

8. In a spring motor, the combination of a pair of frame plates rigidly connected together, a driving shaft whose axis is parallel to and located between said plates, a bearing for one end of said shaft integral with one of said plates, and a bearing for the other end of said shaft rigidly but detachably connected to the other of said plates whereby upon the removal of said detachable connection said driving shaft may be removed from said bearings.

9. In a spring motor for talking machines, the combination of a pair of upper and lower frame plates spaced apart but rigidly connected together, a bearing support integral with and extending upwardly from the lower frame plate, and a bearing plate pivotally secured to the upper frame plate, a downwardly extending bearing support integral with said bearing plate, means for rigidly securing said bearing plate to said frame plate and a horizontal shaft mounted in said bearing supports, said shaft having mounted thereon a gear wheel for driving a train of gears carried by said frame plates.

10. In a spring motor, the combination of upper and lower frame plates spaced apart and rigidly connected together, a spring driven driving shaft mounted upon said frame plates, one of said bearings being integrally connected to the lower frame plate and the other of said bearings being mounted in a bearing plate, said bearing plate being rigidly but detachably connected to the upper frame plate, and a winding shaft carried by said bearing plate having gear connections with said driving shaft.

11. In a spring motor for talking machines, the combination of upper and lower frame plates spaced apart and rigidly connected together, a gear train located between said frame plates, a spring driven shaft having gear connections with said gear train for driving the same, bearings for said gear shaft upon said frame plates comprising an upwardly extending bearing support integral with the lower frame plate, a bearing plate rigidly but detachably connected to the upper frame plate, a downwardly extending bearing support integral with said bearing plate for the other end of said shaft, and a winding shaft carried in bearings upon said bearing plate said winding shaft having gear connections with said driving shaft whereby upon detaching said bearing plate from said upper frame plate the driving shaft may be detached from the frame without disturbing the gear train.

In testimony whereof, I have hereunto set my hand this 19th day of Sept., 1914.

PLINY CATUCCI.

Witnesses:
   LOUIS M. SANDERS,
   NORMAN E. ZUSI.